Oct. 1, 1968  R. A. DINKEL  3,403,744
INDUSTRIAL PERSONNEL VEHICLE
Filed Sept. 23, 1965  2 Sheets-Sheet 1
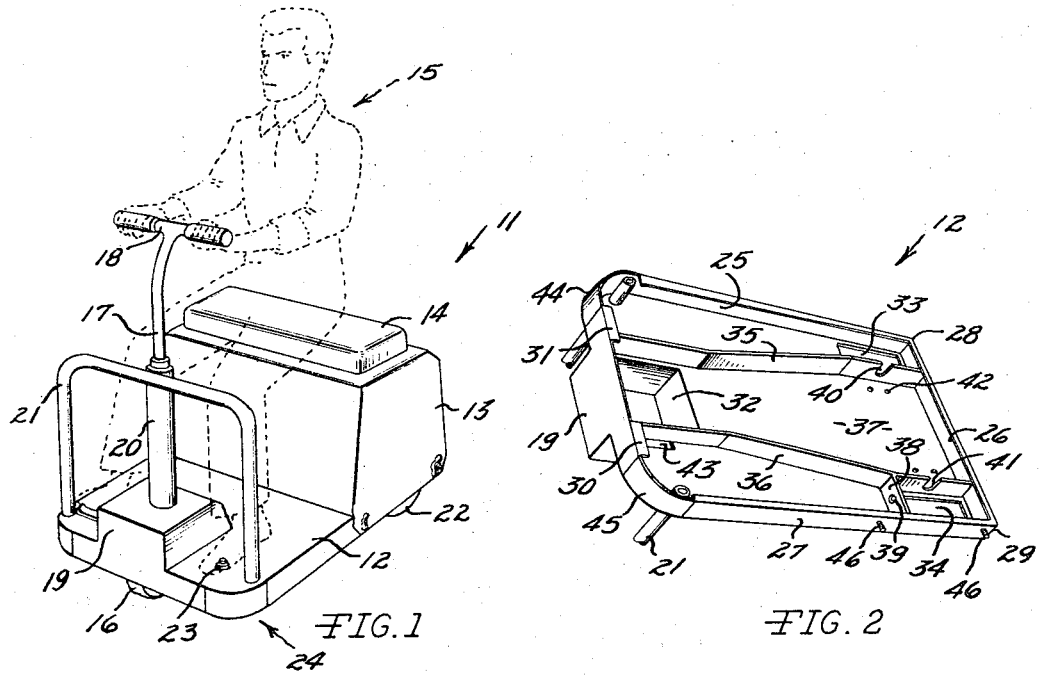
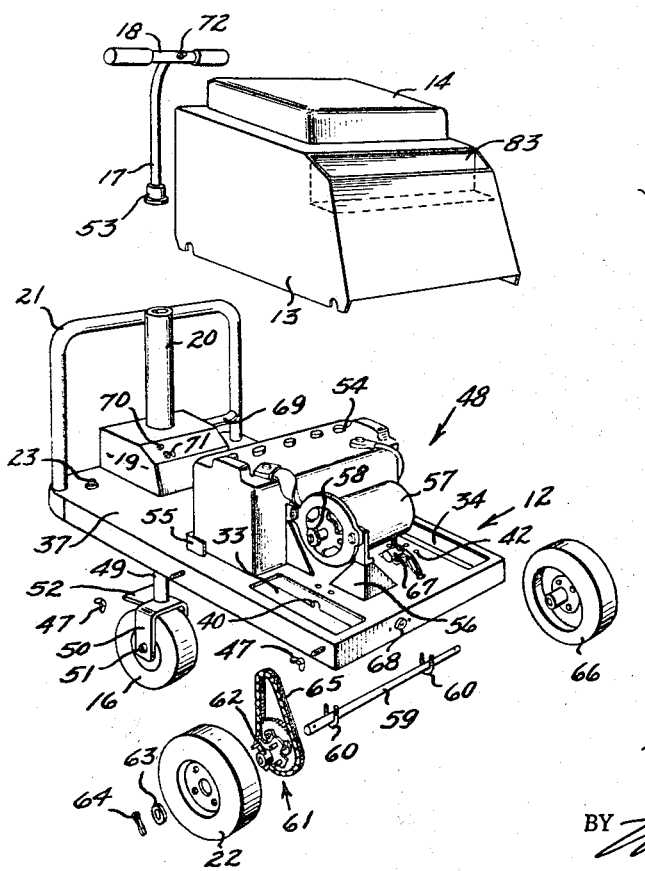
INVENTOR
RICHARD A. DINKEL
BY
ATTORNEYS

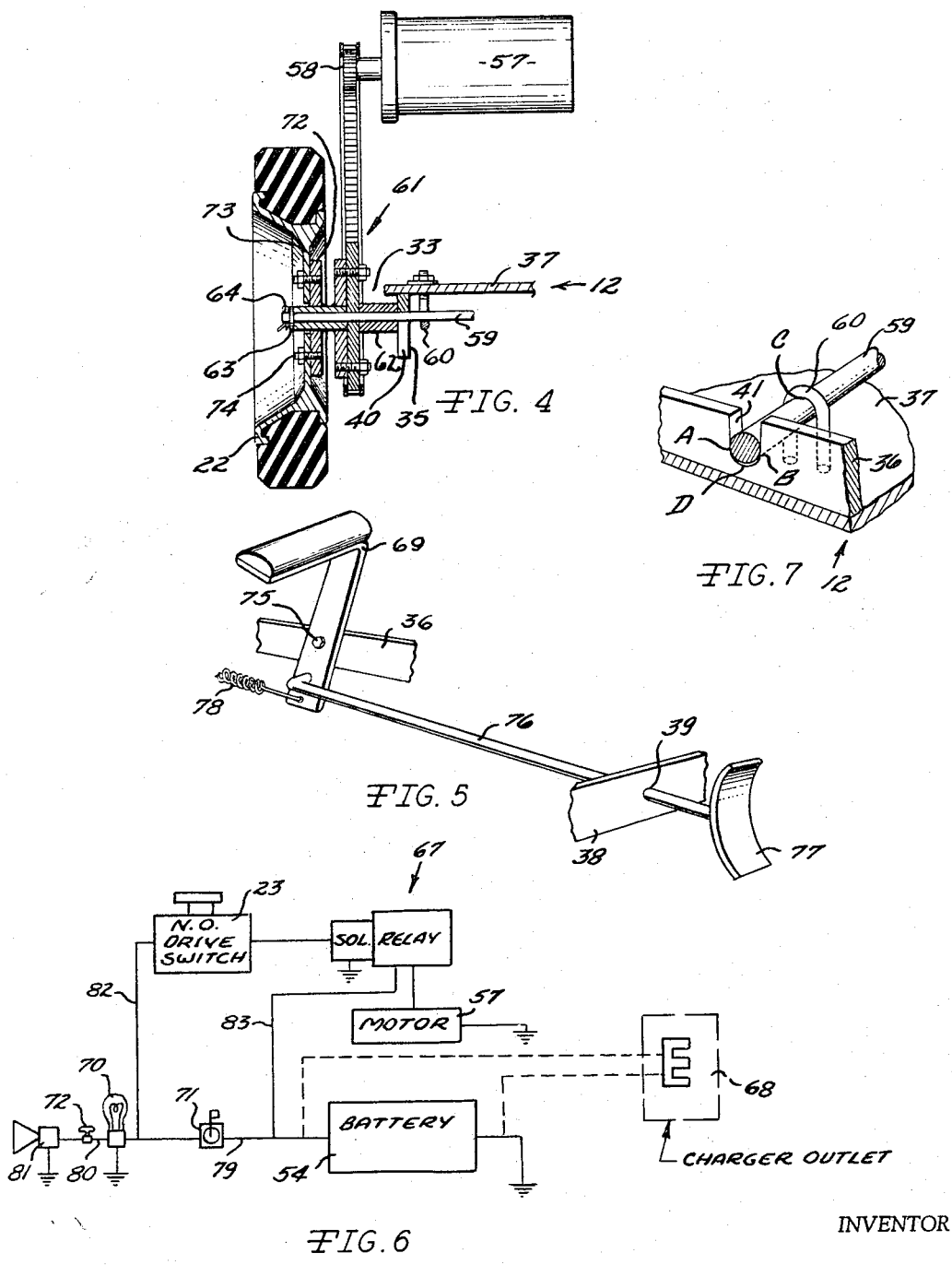

United States Patent Office 3,403,744
Patented Oct. 1, 1968

3,403,744
INDUSTRIAL PERSONNEL VEHICLE
Richard A. Dinkel, East Lansing, Mich., assignor to American-Mobile Products Corporation, Lansing, Mich., a corporation of Michigan
Filed Sept. 23, 1965, Ser. No. 489,509
1 Claim. (Cl. 180—25)

ABSTRACT OF THE DISCLOSURE

A battery powered chain driven three wheel personnel vehicle having a unitary platfrom frame structure provided with a steerable front wheel and two rear wheels mounted on an axile rigidly secured to the frame, one of the rear wheels being an idling wheel and the other being a driven wheel. A chain drive element driveably connecting the rear driven wheel to a battery powered motor provided on the frame.

The present invention relates to battery powered chain driven three wheel personnel vehicles for facilitating the movement of industrial personnel through plant areas. More particularly the present invention relates to an improvement in such structures by providing a unitary metal frame platform and simple axle suspension in the frame so that journaling is accomplished in the wheels. Hence, the structure involves the driving of only a single wheel in a three wheel structure with attendant advantages and economies. As will be seen, battery, motor, and drive linkage are housed under a comfortable seat and cover so that the major weight of vehicle and personnel is centered a trifle forward of the rear axle for maximum stability. A single front wheel provides steering control and complex clutching is avoided by the use of simple on-off switch control to the motor and mechanical brake acting on one rear wheel. Front curvature of the frame allows a relief against hang-up thereby assuring safe performance.

The following United States Letters Patents constitute the most pertinent of prior art as known to the time of filing:

R. A. Wiegal, 3,099,326; D. Dow, 3,190,387; V. G. Brundeman, 2,844,209; C. E. Quisenberry, 2,917,122; I. R. Lang, 2,966,951; W. A. Jensen 2,973,048.

While battery powered personnel vehicles are not unknown, the present structure is distinguishable in simplicity and in unitary carriage or body construction to provide strength and durability at reasonable cost and light weight. These devices have found use in large plants and warehouses to transport personnel, for example from office to shop or inspection sites in a speedy maner with substantial time saving and vastly improved safety features.

In the drawings

FIGURE 1 is a perspective view of the personnel vehicle of the present invention and indicating a driver in phantom line.

FIGURE 2 is a bottom perspective view of the unitary frame of the personnel vehicle.

FIGURE 3 is a partially exploded perspective view of the personnel vehicle and indicating its simplicity assembled to the unitary frame.

FIGURE 4 is a partial rear elevation view in partial cross section and indicating the mounting of the drive wheel and sprocket.

FIGURE 5 is a perspective view of the brake linkage in the personnel vehicle and indicating guide relationship through the frame.

FIGURE 6 is a schematic wiring diagram for motor control.

FIGURE 7 is a fragmental perspective view of connection of axle to frame.

General description

In general the structure of the present invention includes a stamped type frame element which is in support of an axle and a pair of spaced apart rear wheels and a steering column directly coupled to the third front wheel used for steering and by virtue of the U-shaped safety bar greatly strengthens the frame. The frame provides a mount for a simple control panel strength safety guard and seat. The control panel houses the front wheel well and is integrated with the frame and thereby strengthens it. The seat is provided on top of a motor housing which also provides a carrier pocket. The rear of the motor housing slants to provide maximum safety clearance for the operator and to assure that the operator is positioned so as to distribute the load slightly ahead of the rear axle. The motor housing is easily removable from the frame to reveal a battery, a motor and drive linkage connecting the motor in drive relation with one of the two rear wheels. A chain drive is employed and no clutches are necessary. The electric circuitry is relatively simple and includes a master ignition switch, a light circuit, a horn circuit and a motor circuit with suitable relays. The drive switch is preferably foot operated but in special situations a thumb button is used and the drive switch is normally open until selectively closed by the foot or hand of the operator. The closing of the drive switch energizes the motor and turns the drive wheel. A reversing switch is installed where desired. The drive connection is very simple. A chain over the sprocket driven by the motor is connected to a wheel mounted sprocket directly beneath the motor sprocket. The wheel mounted sprocket is in journaled relation with the rear axle shaft. A sprocket connector secures the wheel on one side and the sprocket on the other, all coaxial with the rear axle. The braking system is relatively simple. This includes a frame mounted brake lever protruding through the frame for foot manipulation. The brake lever is pivoted and connected to a brake rod extending underneath and parallel to the frame and guided by passage through a wheel skirt welded to and comprising a part of the frame. A brake shoe is connected to the end of the link. A return spring acts against the lever and urges the lever into disengaged normal position. As the lever is pivoted by the foot of the operator the rod or brake link is moved toward radial engagement with the non-driving of the two rear wheels. The shoe frictionally engages the thread of the wheel and the vehicle stops as the wheel is stopped.

The front wheel is mounted in a yoke and is journaled in the vertical steering column. The yoke includes a protruding stop which prevents the thread of the wheel engaging the frame or wheel well elements.

The frame is constructed from a single sheet of metal stock, pierced to provide wheels openings and bent to provide a peripheral channel at sides and rear. Hence, the frame or platform is somewhat like an inverted pan self strengthened by its integrally formed channel edge. The channel is relieved at the front and special curved bumper edges are provided which are connected to the channel portion and the mid front portion blending with the control panel and front wheel cover. The selection of curvature is unique and the U-shaped safety bar is connected at the base of the curvature on each side and strengthens frame and steering column. The frame is rigidified by strengthening webs which extend the length of the frame and from wheel pockets together with shorter transverse sheet metal members.

In driving the vehicle only two things are necessary for the driver to remember. He must depress the drive switch for power. He uses the brake for controlling speed and stopping and he should coordinate his stopping with release of the drive switch, thereby cutting power.

Steering is by means of a handle bar journaled in a steering tube or column at the front of the vehicle and directly coupled to the front wheel of the vehicle. A charge receptacle is mounted at the rear of the frame so that when the vehicle is not in use it can be attached to a conventional battery charger to maintain best operating condition for vehicle and battery.

*Specific description*

By reference to the drawings and particularly FIGURE 1, the present invention comprises a three wheel personnel vehicle 11 which includes a unitary frame 12, a removable motor cover 13 nesting over a rear portion of the frame 12 and including a cushioned seat 14. It will be noted that the motor cover 13 is slanted upward and forwardly from the rear of the frame 12 thereby maximizing the clearance between the back of the operator 15 and the rear of the vehicle 11. In addition, this positions the operator 15 along with contained apparatus so as to locate the center of gravity ahead of the rear axle of the vehicle 11 for maximum stability. The front wheel 16 steers the vehicle 11 in accord with movement of the steering wheel shaft 17 as it is moved by the operator 15 manipulating the steering bar 18. Control panel 19 provides a wheel well for the wheel 16 and a base support for the steering column 20 which journals the wheel shaft 17. The column 20 is rigidly supported by center attachment to the inverted U-shaped safety bar 21 which is secured to the frame 12. The safety bar 21 is secured, as will be seen at each end, through and to the frame 12 at the interior edges thereof. The rear wheel 22 is a driven wheel which, as will be seen, propels the vehicle 11 when the operator 15 depresses the drive button 23. The curvature 24, at the front of the vehicle 11 is especially determined so as to allow maximum tilt without interference.. This, as will be seen, increases the stability of the vehicle 11 in use while permitting a simple unitary frame construction.

By reference to FIGURE 2 the unitary character of the frame 12 is best revealed. The frame 12 forms the platform surface of the vehicle 11 and is stamped or formed from a single piece of metal shaped and bent to provide three peripheral channel edges 25, 26, and 27 welded at the rear corners 28 and 29. At the front of the frame 12 similar channel edges 30 and 31 are provided which flank the front wheel opening 32. Rear wheel openings 33 and 34 are provided in spaced apart relation through the frame 12 as shown. Longitudinal struts or webs 35 and 36 extend the entire length of the vehicle 11 in a plane transverse to the platform surface 37. At the front of the vehicle 11 the webs 35 and 36 flank the opening 32 and then diverge rearwardly to form the inboard downturned housings for each of the rear wheels flanking rear wheel openings 33 and 34. The webs 35 and 36 are secured to the frame 12 at the channel edges as by welding and are also welded to the platform surface 37. This provides excellent strength of platform 37 and frame 12 with minimum addition of weight. The strut 36 is further strengthened by the short brake guide plate 38 between strut 36 and channel edge 27. An opening 39 is provided centrally through the plate 38 and forms, as will be seen, a brake rod guide opening. Inline notches 40 and 41 in spaced apart parallel relation and centered on the wheel openings 33 and 34 are provided in the struts 35 and 36. The notches 40 and 41 are axle pockets. Openings such as 42 are pierced through the platform 37 to provide mounting means where desired. The brake lever opening 43 is also pierced through the platform 37 adjacent the control panel 19. Two symmetrically positioned bumper plates 44 and 45 close the peripheral gap between the channel portions of the frame 12. These are not channel-like in cross section and are secured as by welding where their uppermost edges contact the platform 37. Accordingly, they provide a resiliency in the front corner portions of the vehicle 11 and conform to a curvature 24 in accord with the following formula defining the radius of curvature:

$$\frac{\text{Road clearance (in inches)} \times \text{Distance between front and rear wheel axle (in inches)}}{\text{Distance between tread centers (in inches)}} = \text{Radius of curvature (in inches)}$$

This formula establishes a condition of optimum safety while considering the design functions as indicated. Where obstacle contact does occur with the bumper plates 44 and 45 they deform before damaging the vhcicle 11 or springing the frame 12. Collaterally, the selected curvature allows the vehicle to skid at the corner rather than freeze on an obstacle and the vehicle 11 does not tend to overturn. The bumper plates 44 and 45 are strengthened by the ends of the tubular safety bar 21 which extends through the platform 37 and the ends thereof are welded in lineal contact at the juncture of the bumper plates 44 and 45 and sides 25 and 27 of the frame 12. This imparts tremendous structural strength without addition of great weight and this strength, as will be seen, adds support to the frontal safety guard for the operator 15 and provides upper support for the steering column 20. Lateral threaded protuberances 46 extend from the frame 12 for securing the motor cover or housing 13 to the frame 12.

By reference to FIGURE 3 the cover 13 with seat 14 is removed from the frame 12 by loosening the wing nuts 47 from the threaded protuberances 46 and the drive mechanism 48 is fully revealed in its attachment to the frame 12. The steering shaft 17 is removed from the column 20 and is disconnected from the tubular yoke support 49 so as to drop the front wheel 16 and reveal the yoke element 50 which supports the front axle pin 51 in anti-friction bearing relation with the wheel 16. An integral extension 52 protrudes from the yoke 50 at the top thereof and serves as a limit stop interfering with the interior walls of the wheel housing formed by the control panel 19 and preventing the wheel 16 from turning contact with frame 12 or control panel 19. Shaft 17 extends through the column 20, is interlocked with tubular yoke support 49 in telescoped relation and thrust collar 53 secures the steering shaft 17 to the top of column 20. Where desired suitable anti-friction thrust bearings may be housed therein. When fully assembled the wheel 16 is positioned substantially within and depends from the wheel cover provided by control panel 19 as seen in FIGURE 1. The battery 54 is concealed normally by the cover 13 and is positioned by battery locating bracket 55 which also serves as a locating guide for the front wall of the cover 13. To the rear of the battery 54 a motor bracket 56 locatably supports the rear of the battery 54 and also supports an electric drive motor 57. A drive sprocket 58 is driveably secured to the shaft of the motor 57, the axis of the sprocket 58 being parallel to and spaced above the rear wheel axle 59. The axle 59 is secured parallel to the motor 57 and upon assembly is rigidly secured in the notches 40 and 41 provided in the struts 35 and 36 and the axle 59 is held in secured position against rotation by the U-bolt 60 passed through the opening 42 in the frame 12. A wheel sprocket 61 is journaled on the axle 59 and is driveably connected to the web of wheel 22. Anti-friction bearings may be inserted in the tubular journal housing 62. The wheel 22 is thus journaled on the fixed axle 59 and the assembly is secured as by thrust washer 63 and cotter pin 64 passed through the axle 59. This aligns the sprockets 58 and 61 in drive relation. The drive chain 65 driveably connects the drive and driven sprockets 58 and 61. The wheel 66 is mounted in anti-friction journaled relation on the end of the axle 59 opposite the driven wheel 22. Accordingly, the wheel 66 is otherwise free wheeling in respect to the drive wheel 22. Suitable electrical connections are provided for aontrol over the motor 57 and the wiring harness will be otherwise described. The solenoid and relay 67 is attached to the frame 12 and the battery charger receptacle 68 extends through the rear of the frame 12. Brake lever 69 passes through the frame 12 as indicated and the foot form of the drive switch 23 is seen on the platform 37. Ignition light 70 and ignition switch 71 are indicated on the face of the control panel 19. Horn button 72 is provided centrally on the steering bar 18 and a reversing switch (not shown) may be optionally provided on the control panel 19. The horn (not shown) may be optionally located on the vehicle 11, the preferred location being adjacent to or on the control panel 19.

By reference to FIGURE 4 the unique single wheel drive structure can best be appreciated. The drive motor 57 is mounted above and parallel to the rear axle 59 and the motor drive sprocket 58 is positioned directly above and in line with the wheel sprocket 61. The wheel sprocket 61 is coaxially mounted on the tubular journal housing 62. The sprocket 61 is also secured to the extension of journal housing 62 and flange plate 72 which is detachably secured to the web 73 of the wheel 22 as by wheel studs 74. Thus a direct drive with no clutch structure permits power to be delivered to one of the rear pair of wheels in a three wheel vehicle.

In FIGURE 5, the brake structure is shown in perspective detail. The brake lever 69 extends through the platform 37 of frame 12 and is fulcrumed by brake pivot 75. The brake rod 76 is pivotally connected to the lever 69 and extends beneath the frame 12 through the opening 39 in guide plate 38 and the braking end of the rod 76 is fitted with a wheel engaging brake shoe 77. The brake shoe 77 is thus movable by the rod toward and away from friction engagement with the wheel 66. The brake spring 78 secured at one end to the frame 12 and to the other end to the lever 69 and acting in-line with the rod normally urges the brake lever and shoe into released position. While the brake lever 69 is of the foot operated type it will be appreciated that it could be extended for manual operation as where the vehicle 11 is used for paraplegic or handicapped messengers in industrial plants.

The FIGURE 6 is a schematic circuit diagram indicating the simplicity of the D.C. circuit realizable in the simple single wheel drive system of the described vehicle 11. A ground return circuit is provided through the frame 12. The battery 54 provides all power and is recharged by attachment of conventional recharging equipment to the charger receptacle 68. The power control circuit is fed by ignition line 79 through key operated ignition switch 71. When switch 71 is closed the ignition light 70 glows to indicate readiness for operation and the horn circuit 80 to horn 81 is operable when horn switch 72 is selectively closed. Drive control line 82 is also rendered operative by closing the ignition switch 71. The normally open drive switch 23 in the drive control line 82 when closed by foot or manual pressure energizes the solenoid section of relay 67 and closes the normally open motor drive line 83 and the motor 57 operates until release of the drive switch 23. Where reversal of the motor 57 is required a reversing switch is provided between the drive switch 23 and solenoid relay 67. Such a reversing switch (not shown) when desired is manually operable to reverse polarity to the motor 57. The control circuit is accordingly simple and efficient.

In FIGURE 7 the coupling of axle 59 to the frame 12 is illustrated in perspective detail. The notch 41 is seen as a slightly tapering slot having a slightly smaller diameter at the bottom than the diameter of the axle. Accordingly as the U-bolts 60 are drawn tight through the platform 37 of the frame 12 the axle 59 is wedged into the notch 41 in the strut 36 in a three point suspension at areas A and B of the notch 41 and C of the U-bolt 60. This leaves a slight bottoming clearance D as shown. The axles nests similarly in notch 40 and the wedge arrangement provides an almost integral connection of axle 59 to frame 12 so that the wheel extensions equate as stub shafting. No spring suspension is utilized and this arrangement with the axle 59 has proven highly satisfactory and resistant to shear forces and loosening in heavy industrial usage. The carrier pocket 83 (best seen in FIGURE 3) and a part of the cover 13 provides a convenient carrier for books, tools, drawings and other instruments or stock.

As a personnel vehicle the described structure achieves speeds up to 10 miles per hour and approximately 24 hours of continued operating service between charges. The device is rugged, dependable and safe under industrial plant conditions and its controls are simple. The unique unitary frame, anti-friction journaling, and bumper front edge design with provision for mass ahead of the rear axle have made this structure a necessity in personnel vehicle situations where time saving in personnel transport is much sought after.

The rectangular character of the frame 12 with parallel channeled sides 25 and 27 and the channeled back 26 secured at their folds results in a sturdy and economical framing. The modification at the front of the vehicle frame 12 uses control panel 19, channel sections 30 and 31 and safety bar 21 in an advantageous way to strengthen the front of the vehicle 11 without massive increase in frame weight. The bumper plates 44 and 45 provide front cornering relief and a frame resiliency complementing the longitudinal struts 35 and 36. In other respects the weight of operator 15 and drive elements is used advantageously to stabilize the relatively light frame 12. Welding of joints is preferred but other common fastening means well known in the art may be used without departure from the spirit of the invention. Welding results in a quiet frame and operation.

Having thus described an operative embodiment of my invention others skilled in the art will perceive improvements, changes and modifications. Such improvements, changes and modifications are intended to be included herein limited only by the scope of my hereinafter appended claims.

I claim:
1. A personnel vehicle for plant and messenger usage comprising:
 (a) a unitary frame;
 (b) a housed front wheel at the forward portion of said frame;
 (c) steering means through said frame and supporting said front wheel;
 (d) longitudinal struts secured beneath said frame and in support thereof;
 (e) a rear axle extending across said frame and secured rigidly to said struts;
 (f) two wheels journaled on said axle at the ends thereof, one of said wheels being an idling wheel and the other of said wheels being a driven wheel;
 (g) an electric motor bracketed on said frame and driveably connected to said driven wheel;
 (h) a battery forward of said motor and selectively supplying energy to said motor;
 (i) a motor and battery cover detachably secured to said frame and having a seat thereupon and covering said motor and said battery, said seat positioned by said cover forward of said axle;
 (j) a safety bar in support of said steering means and secured to said frame at the edges thereof;
 (k) control means selectively energizing said motor positioned on said frame; and

(I) a brake operably connected from the front of said vehicle to bear upon the idling one of said rear wheels.

References Cited

UNITED STATES PATENTS

| | | | |
|---|---|---|---|
| 2,207,447 | 7/1940 | Viles et al | 180—27 |
| 2,749,997 | 6/1956 | Deslippe | 180—25 |
| 2,876,854 | 3/1959 | Tetyak | 180—72 X |
| 2,903,082 | 9/1959 | Marcus | 180—65 |
| 2,917,122 | 12/1959 | Quisenberry | 180—25 |
| 2,973,048 | 2/1961 | Jensen | 180—27 |
| 3,002,782 | 10/1961 | Jahn | 280—106 X |

KENNETH H. BETTS, *Primary Examiner.*